United States Patent
Croak et al.

(10) Patent No.: US 7,664,038 B2
(45) Date of Patent: Feb. 16, 2010

(54) METHOD AND APPARATUS FOR EVALUATING COMPONENT COSTS IN A COMMUNICATION NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 500 days.

(21) Appl. No.: 11/343,361

(22) Filed: Jan. 31, 2006

(65) Prior Publication Data

US 2007/0177508 A1  Aug. 2, 2007

(51) Int. Cl.
*G01R 31/08* (2006.01)
(52) U.S. Cl. .................................................... 370/238
(58) Field of Classification Search ................ 370/238, 370/216, 229, 230, 235, 254
See application file for complete search history.

(56) References Cited

U.S. PATENT DOCUMENTS

| | | | | |
|---|---|---|---|---|
| 6,256,295 | B1 * | 7/2001 | Callon | 370/254 |
| 6,956,820 | B2 * | 10/2005 | Zhu et al. | 370/230.1 |
| 7,307,956 | B2 * | 12/2007 | Kaplan et al. | 370/238 |
| 2005/0207413 | A1 | 9/2005 | Lerner | |

FOREIGN PATENT DOCUMENTS

| | | |
|---|---|---|
| EP | 1592167 A | 11/2005 |
| WO | WO-2004/055615 A | 7/2004 |

OTHER PUBLICATIONS

International Search Report and Written Opinion for PCT/US2007/002510, consists of 14 unnumbered pages.

* cited by examiner

*Primary Examiner*—Kwang B Yao
*Assistant Examiner*—Anh Ngoc Nguyen

(57) ABSTRACT

A method and apparatus for calculating a cost index in a communication network. In one embodiment, a plurality of first cost factors associated with a first set of network elements is obtained. Subsequently, a plurality of second cost factors associated with a second set of network elements is obtained. A first cost index is then determined based on the plurality of first cost factors associated with the first set of network elements. Similarly, a second cost index is determined based on the plurality of second cost factors associated with the second set of network elements. Afterwards, the first cost index is compared to the second cost index to determine a point in time when a service provider should minimize new investment in the first set of network elements.

3 Claims, 4 Drawing Sheets

METHOD AND APPARATUS FOR EVALUATING COMPONENT COSTS IN A COMMUNICATION NETWORK

BACKGROUND OF THE INVENTION

1. Field of the Invention

Embodiments of the present invention generally relate to telecommunications systems and, more particularly, to a method and apparatus for calculating the cost of network components in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

In order to be successful, VoIP network providers should offer highly reliable services to subscribers with service availability equivalent to conventional circuit-switched networks, such as the PSTN. VoIP providers, however, typically operate at a much lower cost structure than traditional providers of telephony services. Despite this advantage, it is difficult for VoIP providers to know if they should continue investing in legacy time division multiplexed (TDM) equipment or invest in new IP based equipment. Accordingly, there exists a need in the art for a method and apparatus for evaluating component costs in a communication network.

SUMMARY OF THE INVENTION

A method and apparatus for calculating a cost index in a communication network are disclosed. In one embodiment, a plurality of first cost factors associated with a first set of network elements is obtained. Subsequently, a plurality of second cost factors associated with a second set of network elements is obtained. A first cost index is then determined based on the plurality of first cost factors associated with the first set of network elements. Similarly, a second cost index is determined based on the plurality of second cost factors associated with the second set of network elements. Afterwards, the first cost index is compared to the second cost index to determine a point in time when a service provider should minimize new investment in the first set of network elements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
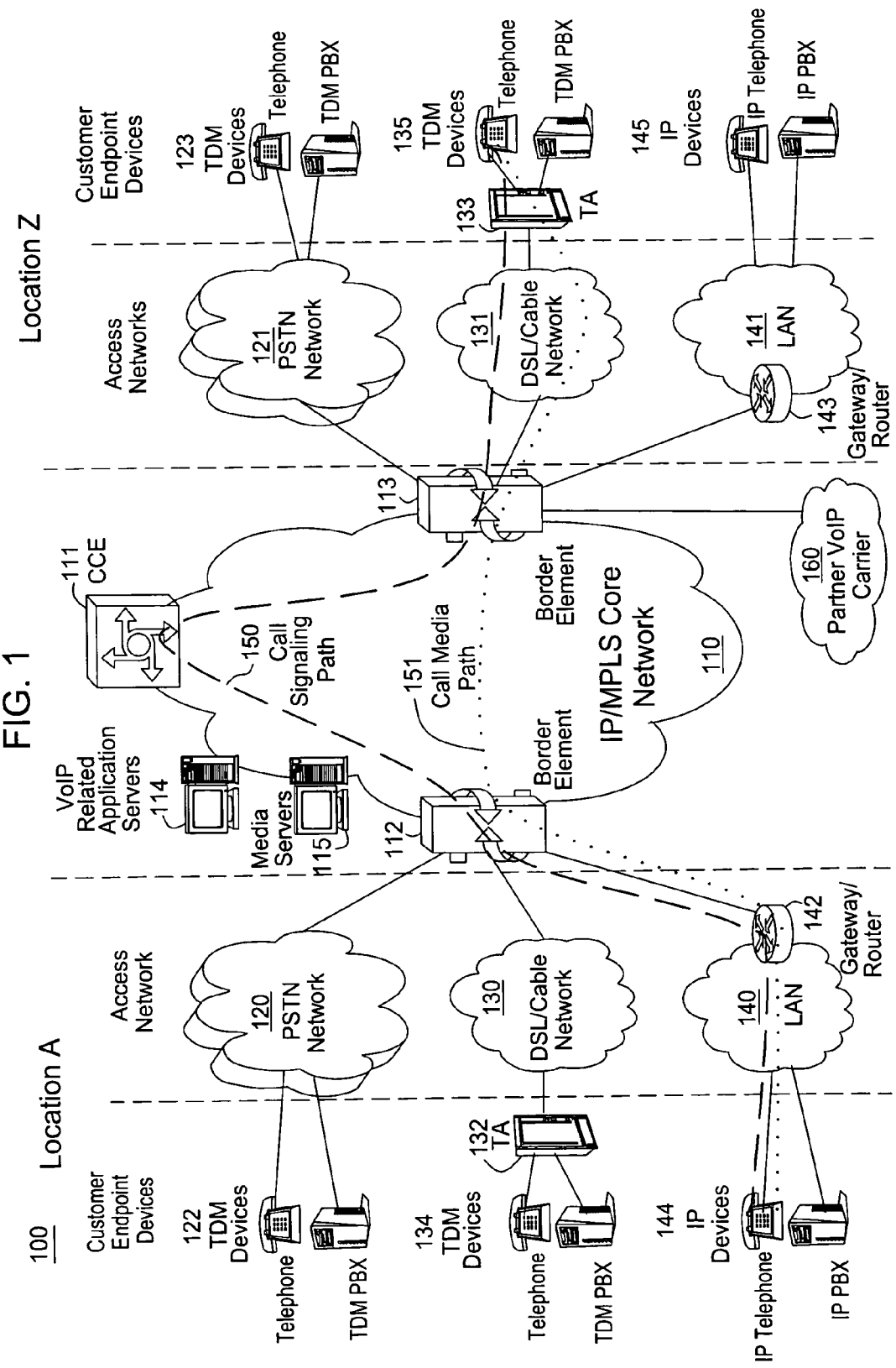
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
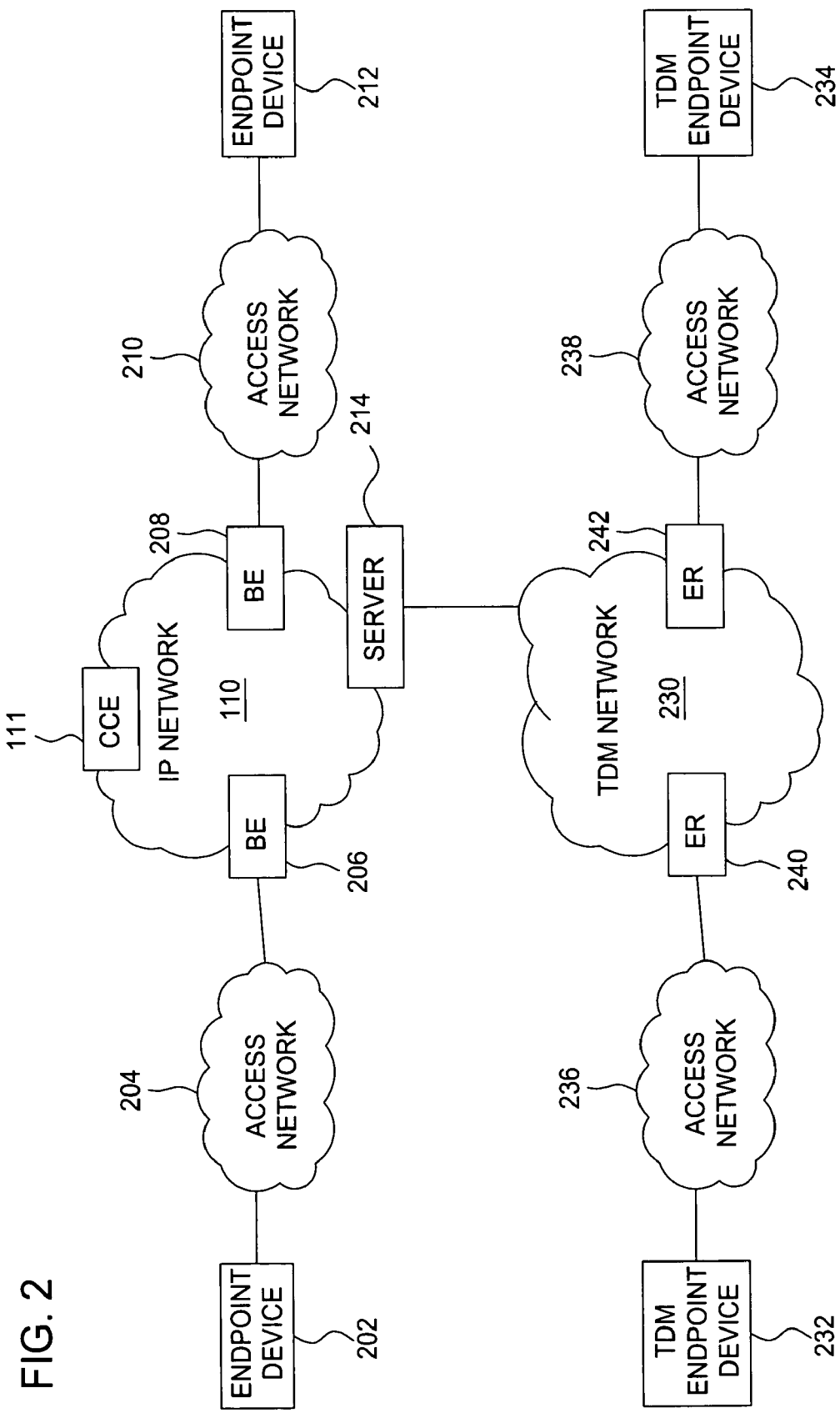
FIG. 2 is a block diagram depicting an exemplary embodiment of a portion of the communication system of FIG. 1 in accordance with one or more aspects of the invention.

FIG. 2 is a block diagram depicting an exemplary configuration of the communication system of FIG. 1 constructed in accordance with one or more aspects of the invention. In one embodiment, the communication system may comprise both a core IP network 110 and a TDM network 230. Notably, the IP network 110 is the portion of the communication system that services IP based calls and the TDM network is the portion that is responsible for supporting TDM based communications. Although depicted as a common network in FIG. 1, both the IP network 110 and the TDM network 230 may be distinguished from each other since each network utilizes different network components. In one embodiment, the IP network and TDM network are connected to an application server 214.

Notably, the IP network 110 is used to provide IP-based communication services to customers. In one embodiment, an endpoint device 202 is configured for communication with the core IP network 110 via an access network 204 and one or more border elements (BEs) 206. Likewise, an endpoint device 212 is configured for communication with the core network 110 via an access network 210 and one or more BEs 208. The endpoint devices 202 and 212 may comprise any IP based customer endpoint device (e.g., an IP phone) or the like. The access networks 236 and 238 may comprise any of the packet-based, access networks detailed above (e.g., DSL/Cable, LAN, etc).

Similarly, an endpoint device 232 is configured for communication with the core TDM network 230 via an access network 236 and one or more edge routers 240. An endpoint device 234 is configured for communication with the core TDM network 230 via an access network 238 and one or more edge routers 242. In one embodiment, the endpoint devices 232 and 234 comprise TDM customer endpoint devices (e.g., a PSTN compatible phone) or the like. The access networks 204 and 210 may comprise any TDM access network, such as a PSTN or the like.

In one embodiment of the present invention, the server 214 comprises a dedicated application server that is configured to obtain performance data from a variety of network components in the IP and TDM networks. In addition, the application server 214 may be programmed to determine a first set of cost factors associated with the TDM based network components as well as a second set of cost factors associated with the IP based network components that reside in the service provider's communication network. For example, the application server 214 may be configured to request or passively receive performance data from all of the network components in the IP network 110 and TDM network 230. In one embodiment, the performance data may be obtained from call detail records (CDRs) generated by the network elements. In one embodiment, the performance data may include the number of different customers that are supported by a specific network element. Similarly, performance data may detail the number of calls handled by a network element in a given time period. This type of performance related information is ultimately helpful for determining the cost factors for both the TDM network elements and the IP based network elements residing in the network.

After receiving the performance data, the application server 214 is capable of calculating a cost index for each network element. Notably, each respective network comprises a plurality of various network elements. By initially determining an individual cost index for each of the elements within the two networks, the application server 214 is subsequently able to derive a collective cost index for each respective network. This analysis may be conducted at any time by a network operator or upon a predefined condition (e.g., at the time of a network component failure).

In one embodiment, the application server 214 calculates the cost index of a network element by using a number of cost factors, performance data, and a cost index formula. Namely, the application server 214 may utilize a number of cost factors associated with the corresponding network element including, but not limited to, an initial deployment cost (DC), an installation cost (IC), an associated mean time between failures (MTBF), an operational cost (OC), a maintenance cost (MC), and other like factors related to the network element. These factors may be used as input parameters for an equation formulated to ascertain a cost index number of a network element. For example, the following formula may be used:

$$\text{Cost Index} = [(1/\text{MTBF})*(DC+IC)+OC+MC]/(CN) \quad \text{Eqn. 1}$$

where DC, IC, OC, and MC are dollar cost amounts, MTBF represents the number of years between (predicted) component failures, and CN may represent the number of calls received per minute, the number of customers using the network, or some other indication of network utilization. In one embodiment, the costs factor parameters are provided to the application server 214 by a network operator.

In one embodiment, suppose a given network element (e.g., a BE) is characterized by having an initial deployment cost (e.g., purchase cost) of $250,000, an installation cost of $1000, an operational cost of $1500 per year, a maintenance cost of $400 per year, and a MTBF of 5 years. Moreover, the network element is found to service 2500 calls per minute. Consequently, the calculated index for the network element using Eqn. 1 is found to be 20.84 (e.g., [50200+1500+400]/2500). The application server 214 may also use the same procedure to determine the index value for all of the remaining network elements (e.g., CCE, router, etc.).

Once the indexes for the different network component types are determined, the collective network index may be ascertained. In one embodiment, all the calculated cost indexes of the network elements in the network are averaged together to determine the collective index of the network. For example, suppose an IP network comprises two CCEs with cost indexes of 33.5 and 36.9, and six BEs with cost indexes of 28.4, 27.3, 29.0, 28.8, 32.4, and 31.7. In one embodiment, the collective cost index for this network is 31.0 (i.e., [33.5+36.9+28.4+27.3+29.0+28.8+32.4+31.7]/8).

In one embodiment, the present invention may be used to determine the appropriate point in time to stop or slow investment in legacy equipment (e.g., TDM equipment) and infrastructure. For example, a collective index number for the TDM network 230 may be determined in the manner described above and compared to a collective index number associated with the IP core network by the application server 214. If the index number for the IP network is less than the index number corresponding to the TDM network, the application server 214 arrives to the conclusion that the service provider should not continue to invest in legacy TDM equipment. Conversely, if the TDM index is found to be less than the IP network, then the application server 214 will recommend that it may still be feasible to continue investing (e.g., allotting network resources) in the TDM network by replacing or purchasing a new TDM component.

Figure 3:
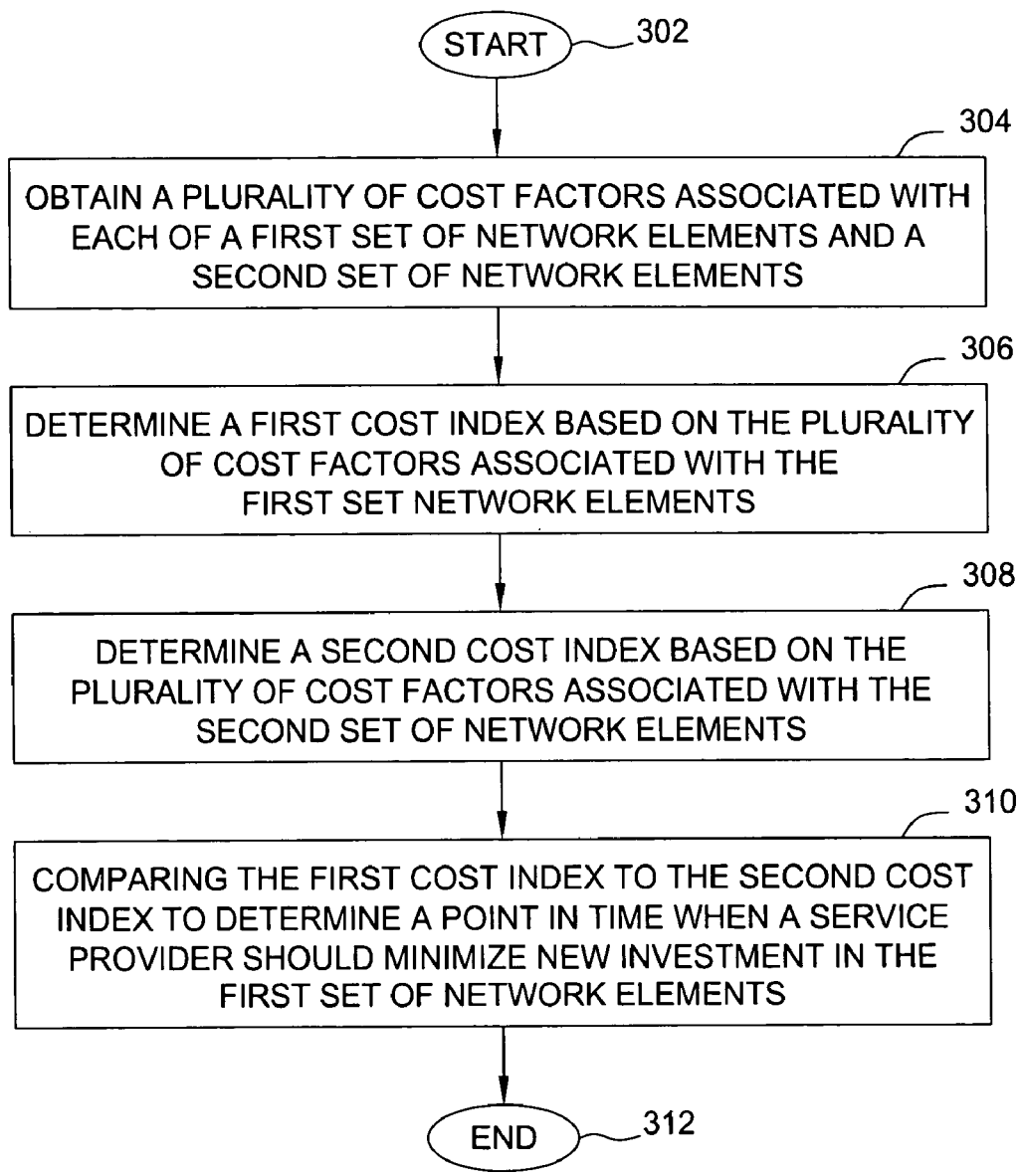
FIG. 3 is a flow diagram depicting an exemplary embodiment of a method for evaluating costs in a communication network in accordance with one or more aspects of the invention.

FIG. 3 is a flow diagram depicting an exemplary embodiment of a method 300 for calculating a cost index in a communication network in accordance with one or more aspects of the invention. The method 300 may be performed by the application server 214. The method 300 begins at step 302 and proceeds to step 304, where a plurality of cost factors associated with each of a first set of network elements and a second set of network elements are obtained.

At step 306, a first cost index based on the plurality of cost factors associated with the first set of network element is determined. At step 308, a second cost index based on the plurality of cost factors associated with the second set of network element is determined. At step 310, the first cost index and the second factor cost index are compared to determine a point in time when a service provider should minimize new investment in the first set of network elements. In one embodiment, an alarm is generated as a notification when the first cost index (e.g., IP cost index) is less than the second cost index (e.g., TDM cost index).

In another embodiment, the alarm may be generated only if the TDM cost index exceeds the IP cost index by a predefined threshold. This embodiment may be more practical in scenarios where it is not feasible to make a move to an IP based network when there is no significant benefit to do so (i.e., it is not worth reconfiguring the system when cost indexes are nearly identical). For example, it is only after the TDM cost index considerably exceeds (e.g., 10% or more) the IP cost index that continuous investment in IP equipment may be warranted. For example, suppose the application server 214 determines that the TDM cost index is 33.0 and the IP cost index is 31.0. Since 33.0 does not exceed 31.0 by more than 10% (e.g., the TDM index would need to be greater than 34.1), an alarm would not be generated in this instance.

At step 312, the method 300 ends.

Figure 4:
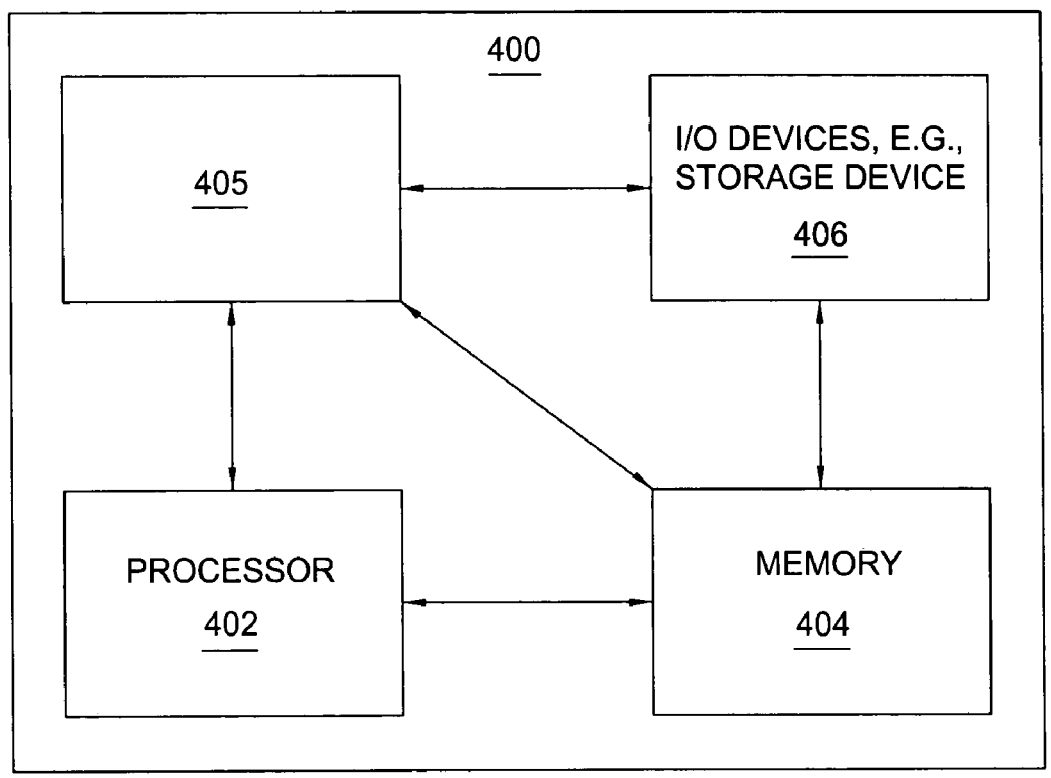
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for calculating a cost index, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for calculating a cost index can be loaded into memory 404 and executed by processor 402 to implement the functions as discussed above. As such, the present process 405 for calculating a cost index (including associated data structures), of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for calculating a cost index in a communication network, comprising:

obtaining a plurality of first cost factors associated with a first set of network elements;

obtaining a plurality of second cost factors associated with a second set of network elements;

determining a first cost index based on said plurality of first cost factors associated with said first set of network elements;

determining, via a processor, a second cost index based on said plurality of second cost factors associated with said second set of network elements, wherein said first and second cost indexes are determined by:

$$\text{Cost Index} = [(1/\text{MTBF})*(DC+IC)+OC+MC]/(CN)$$

where MTBF represents a mean time between failures, DC represents a deployment cost, IC represents an installation cost, OC represents a maintenance cost, MC represents a maintenance cost and CN represents a network usage indicator; and comparing said first cost index to said second cost index to determine a point in time when a service provider should minimize new investment in said first set of network elements.

2. A computer readable medium having stored thereon instructions that, when executed by a processor, causes the processor to perform a method for calculating a cost index in a communication network, comprising:

obtaining a plurality of first cost factors associated with a first set of network elements;

obtaining a plurality of second cost factors associated with a second set of network elements;

determining a first cost index based on said plurality of first cost factors associated with said first set of network elements;

determining a second cost index based on said plurality of second cost factors associated with said second set of network elements, wherein said first and second cost indexes are determined by:

$$\text{Cost Index} = [(1/\text{MTBF})*(DC+IC)+OC+MC]/(CN)$$

where MTBF represents a mean time between failures, DC represents a deployment cost, IC represents an installation cost, OC represents a maintenance cost, MC represents a maintenance cost and CN represents a network usage indicator; and comparing said first cost index to said second cost index to determine a point in time when a service provider should minimize new investment in said first set of network elements.

3. An apparatus for calculating a cost index in a communication network, comprising:

means for obtaining a plurality of first cost factors associated with a first set of network elements;

means for obtaining a plurality of second cost factors associated with a second set of network elements;

means for determining a first cost index based on said plurality of first cost factors associated with said first set of network elements;

means for determining a second cost index based on said plurality of second cost factors associated with said second set of network elements, wherein said first and second cost indexes are determined by:

$$\text{Cost Index} = [(1/\text{MTBF})*(DC+IC)+OC+MC]/(CN)$$

where MTBF represents a mean time between failures, DC represents a deployment cost, IC represents an installation cost, OC represents a maintenance cost, MC represents a maintenance cost and CN represents a network usage indicator; and means for comparing said first cost index to said second cost index to determine a point in time when a service provider should minimize new investment in said first set of network elements.

* * * * *